(12) United States Patent
Khosravi et al.

(10) Patent No.: US 7,814,531 B2
(45) Date of Patent: Oct. 12, 2010

(54) DETECTION OF NETWORK ENVIRONMENT FOR NETWORK ACCESS CONTROL

(75) Inventors: Hormuzd Khosravi, Portland, OR (US); Karanvir Grewal, Hillsboro, OR (US); Ahuva Kroiser, Jerusalem (IL); Avigdor Eldar, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1137 days.

(21) Appl. No.: 11/478,987

(22) Filed: Jun. 30, 2006

(65) Prior Publication Data

US 2008/0022355 A1 Jan. 24, 2008

(51) Int. Cl.
*H04L 9/00* (2006.01)
*H04L 12/22* (2006.01)

(52) U.S. Cl. .............. 726/1; 726/14; 726/29; 709/220; 709/225; 709/229; 709/249; 709/250

(58) Field of Classification Search .......... 726/1
See application file for complete search history.

(56) References Cited

U.S. PATENT DOCUMENTS

| 6,738,908 | B1 | | 5/2004 | Bonn et al. | |
|---|---|---|---|---|---|
| 7,231,661 | B1 | * | 6/2007 | Villavicencio et al. | 726/4 |
| 7,313,812 | B2 | * | 12/2007 | Robinson et al. | 726/1 |
| 7,487,363 | B2 | * | 2/2009 | Alve et al. | 713/193 |
| 2002/0040439 | A1 | * | 4/2002 | Kellum | 713/200 |
| 2002/0138577 | A1 | * | 9/2002 | Teng et al. | 709/205 |
| 2003/0076955 | A1 | * | 4/2003 | Alve et al. | 380/201 |
| 2004/0255147 | A1 | | 12/2004 | Peled et al. | |
| 2005/0188173 | A1 | * | 8/2005 | Hasbun et al. | 711/203 |
| 2005/0213763 | A1 | * | 9/2005 | Owen et al. | 380/270 |

FOREIGN PATENT DOCUMENTS

EP 1458132 9/2004
WO WO-2006001587 1/2006

OTHER PUBLICATIONS

Kagal, L., et al, 'Developing Secure Agent Systems Using Delegation Based Trust Management', 2002, In Security of Mobile MultiAgent Systems (SEMAS 02) held at Autonomous Agents and MultiAgent Systems (AAMAS 02), entire document, http://www.cs.umbc.edu/~finin/papers/semas02/paper.pdf.*

(Continued)

*Primary Examiner*—Edan Orgad
*Assistant Examiner*—Ronald Baum
(74) *Attorney, Agent, or Firm*—Blakely, Sokoloff, Taylor & Zafman LLP

(57) ABSTRACT

A method and apparatus for detection of network environment to aid policy selection for network access control. An embodiment of a method includes receiving a request to connect a device to a network and, if a security policy is received for the connection of the device, applying the policy for the device. If a security policy for the connection of the device is not received, the domain of the device is determined by determining whether the device is in an enterprise domain and determining whether the device is in a network access control domain, which allows selection of an appropriate domain/environment specific policy.

25 Claims, 6 Drawing Sheets

OTHER PUBLICATIONS

"PCT/US2007/071835 IPRP Mailed Jan. 30, 2009", (Jan. 30, 2009), Whole document.

U.S. Appl. No. 11/171,593, filed Jun. 29, 2005, to Howard C. Herbert et al., for Methods, Apparatuses, and Systems for the Dynamic Evaluation and Delegation of Network Access Control.

"Business Challenge", *Reducing Enterprise Management Costs With Intel Active Management Technology*, Intel White Paper, 6 pages, Order No. 312831-01US, Intel Corporation 2006.

"Discover, Heal, and Protect Your Networked Computing Assets", Intel Technology Brief, 8 pages, Order No. 303749-006US, Intel Corporation 2006.

Daniel Deliberato, "Intel and Cisco Collaborate to Improve Enterprise Security", *Technology@Intel Magazine*, Sep. 2005, pp. 1-8, Intel Corporation 2005.

Cisco Systems, "Network Admission Control", 2 pages, Cisco Systems, Inc. 2005.

Cisco Systems, "Network Admission Control Executive Summary", Oct. 2005, 16 pages, Cisco Systems, Inc.

Cisco Systems, "Network Admission Control", 14 pages, Cisco Systems, Inc. 2005.

Intel Corporation, "Intel Unveils New Silicon Management Technology to Better Address Computer Maintenance and Inventory", 2 pages, Sep. 7, 2004, Intel Corporation.

Intel Corporation, "Intel Active Management Technology", 2 pages, (undated), Intel Corporation.

"PCT/US2007/071835 International Search Report and Written Opinion Mailed Nov. 30, 2007", (Nov. 30, 2007), 10 pages.

IPO, Examination Report for Patent Application No. GB0818925.0 mailed Jul. 7, 2010.

* cited by examiner

DETECTION OF NETWORK ENVIRONMENT FOR NETWORK ACCESS CONTROL

FIELD

An embodiment of the invention relates to computer operations in general, and more specifically to detection of network environment.

BACKGROUND

Because of the rise in virus and worm attacks in computer operations, and the trend of these worms propagating into corporate networks, there are industry efforts to require evaluation of a device before allowing that device to connect to a protected network. These efforts have manifested themselves in multiple standards based and proprietary solutions for measuring various attributes of devices, making policy decisions regarding allowing connection of such devices, and providing acknowledgement of allowances, such as in returning a token back to a connection point to indicate whether a device is allowed on the network and which resources should be accessible on that network. These issues are of particular interest to corporate IT departments in ensuring that unauthorized or incompliant devices are prevented from accessing the corporate network.

However, in conventional systems it may not be clear what the current environment is with regard to connection security for a device. If a connection security environment appears to be unavailable, it may not be apparent what the reason for the unavailability is. Because of these uncertainties regarding the environment, there may be difficulty in determining what actions should or should not be allowed with regard to the device.

BRIEF DESCRIPTION OF THE DRAWINGS

The invention may be best understood by referring to the following description and accompanying drawings that are used to illustrate embodiments of the invention. In the drawings.

DETAILED DESCRIPTION

Figure 1:
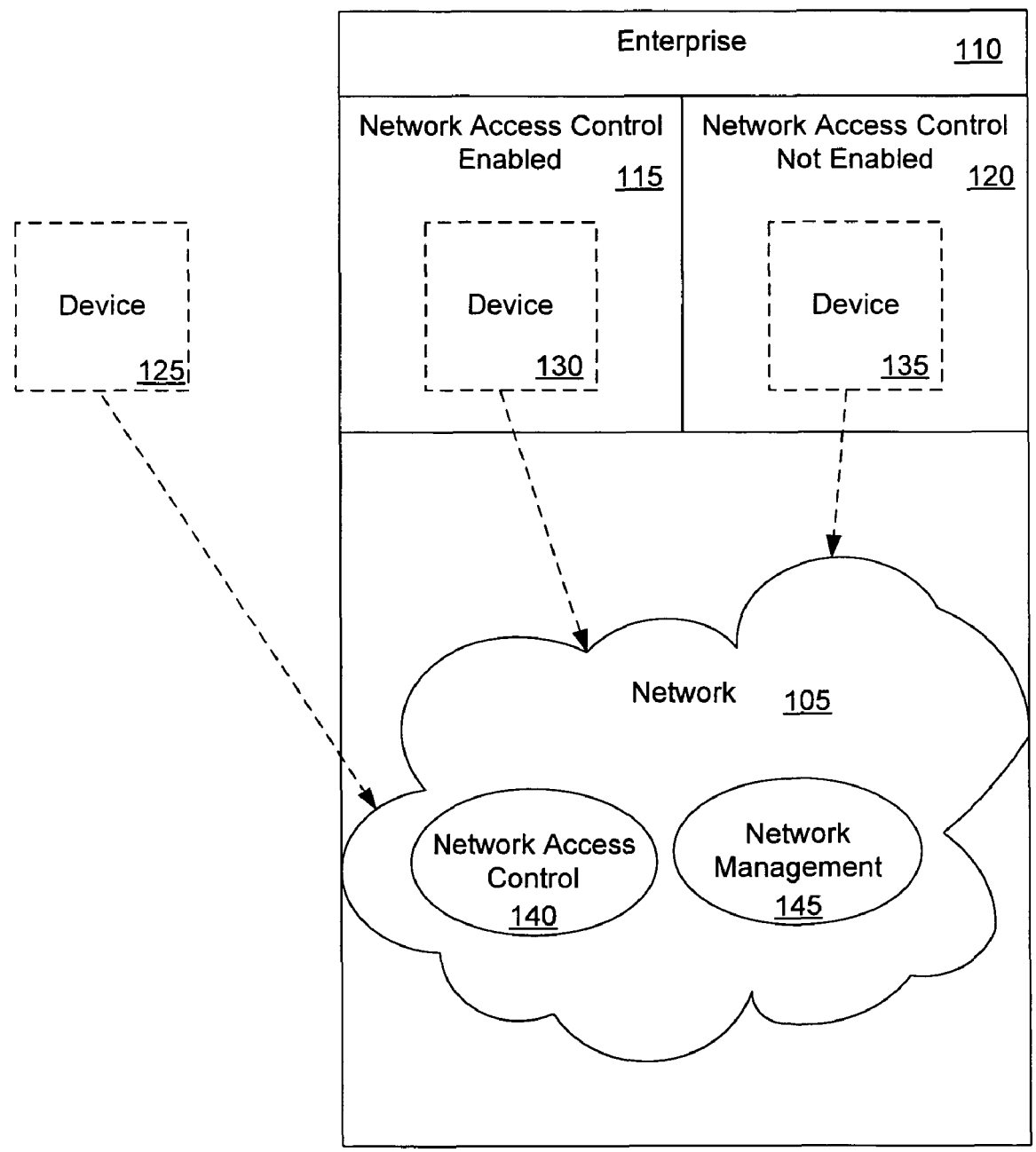
FIG. 1 is an illustration of an embodiment of detection of a network environment for the connection of a device to the network.

A method and apparatus are described for detection of network environment to aid policy selection for network access control.

As used herein, "network access control" means an apparatus, system, or process to enforce security requirements with regard to devices seeking to access or connect with a network. Network access control is intended to protect the network from security breaches, and prevent, for example, malware such as viruses, worms, spyware, and related elements. The term network access control (NAC) describes a generic framework whereby devices seeking access to a network are challenged to provide appropriate credentials and additional configuration/state of the device, which is used by a central policy server to dictate if the device should be allowed to access the network. The policy server may work in conjunction with a policy enforcement point (typically a network device such as a switch, router, or gateway) to allow trusted devices (such as PCs (personal computers), servers, and PDAs (personal digital assistants)) onto the network and restrict noncompliant devices from accessing the network.

As used herein, "network management" means an apparatus, system, or process to provide for management of network resources. The term network management includes, but it not limited to, Intel® Active Management Technology (AMT), which provides capabilities for managing a system even when devices are not active.

In an embodiment of the invention, a system assists in the protection of a network by determining the status of the platform with regard to network access control. In an embodiment, the system determines the current environment for a device that is seeking to connect to a network. In an embodiment, when a device is connected to the network, there is a determination whether the address domain is an enterprise domain and, if so, whether the domain includes network access control capabilities. In an embodiment of the invention, a system may be operating for both static and dynamic IP (Internet protocol) addressing.

In an embodiment of the invention, a method and apparatus are provided for detection of a secure environment including device connection security. A detected environment may include, but is not limited to, different forms of Network Access Control (NAC) as detected by Intel® Active Management Technology (Intel® AMT). NAC is a framework that is increasingly used in enterprise network security. NAC uses network infrastructure to enforce security policy compliance for devices connecting to a given network. The technology makes use of several authentication, authorization and security standard protocols, including as IEEE 802.1X (2001), EAP (Extensible Authentication Protocol), for authentication of enterprise host platforms for the network elements before granting them network access. EAP is a framework for extending authentication techniques in PPP (Point-to-Point Protocol), but is readily used over different transport protocols such as IEEE 802.1X. PPP is designed to transport datagrams over a point-to-point link. EAP is addressed, for example, in RFC 2284 (PPP Extensible Authentication Protocol, March 1998).

In an embodiment of the invention, device connection security is integrated with network management, with the integrated systems being used to detect the state of a platform with regard to device connection security. For example, integration of NAC technology with AMT may be used to form a complete enterprise security solution, operating both from the perspective of end-point platforms and from the overall network. In an embodiment of the invention, detection of the device connection security environment, such as the NAC environment, by network management, such as AMT, may be implemented to provide secure integration of these two technologies and to provide for integration of network policies and seamless operations in different environments. In a particular example, integration of network policies may include configuration of Circuit Breaker policies by AMT. In an embodiment of the invention, a method in provided for environment detection by a network management system that works for both static and dynamically allocated IP addresses on the host.

In one embodiment, an environment detection method leverages existing network infrastructure, such as DHCP (dynamic host configuration protocol) servers, to provide a solution that requires minimal changes to existing network management. DHCP is a protocol used by computers in determining IP addresses in dynamic IP addressing. In an embodiment, the capabilities of this protocol are applied to detection of environment for a connecting device.

To provide an example, with a typical NAC protocol exchange a client, which may be referred to a supplicant or Access Requestor (AR) exchanges data with an enterprise policy server to seek access to a network. The AR typically initiates a network connection, such as via IEEE 802.1X/EAP, to a network access device (NAD), which generally is a network router or switch. The AR may then be redirected to a policy decision point (PDP), thereby communicating the intent to connect to the network via a control channel connection request. The control channel connection request is ultimately routed to a policy server that is equipped to make authorization decisions on network access, based on an administrative policy or control protocol. As part of this control protocol, device information such as device identity and state are conveyed by the AR, thereby enabling the policy server to make an informed decision on allowing the client to access the given network. Once a decision is made, it is typically conveyed to a NAD or Policy Enforcement Point (PEP), which controls if and how the client device is allowed onto the network.

NAC relies on a trusted host platform agent in order to assure enterprise network security. In one example, a system instituting AMT technology provides a trust anchor on the system platform for a secure exchange, including an NAC exchange. The AMT collects the platform posture information in a host OS (operating system) independent manner and attests that information by signing it with a private key that is associated between the AMT and the PDP through PKI (public key infrastructure). In this manner, the AMT provides high assurance of the host posture to the PDP within a secure envelope that cannot be modified en-route.

In an embodiment of the invention, a method is provided for a system to detect in which environment a device is running with respect to network connectivity. The environment is important since it may determine the applicable security, including, but not limited to, the circuit breaker filter policies applied by AMT on the network traffic flowing in and out of the platform. For example, the circuit breaker policies for a mobile platform operating within the enterprise domain will be different (for example, to allow all traffic) from those policies enforced while this platform is operating outside of the enterprise domain trying to access the enterprise (for example to only allow VPN traffic). In a particular example, the policies for a platform that is running inside an NAC domain in an enterprise are different than the policies for a platform running outside the NAC domain.

In an embodiment of the invention, a system, such as a system including Intel® AMT, may discover its environment for both statically and dynamically allocated IP address scenarios. The system may use the options present in the DHCP protocol to provide for environment detection in a dynamic IP scenario. An embodiment of an algorithm may be implemented as part of a firmware stack, including the AMT firmware stack. In an embodiment, the algorithm uses the domain name information in the response, such as a DHCP response, to the AMT/host to determine if the platform is in an enterprise domain. Similarly, the algorithm may use a DHCP option, which can be configured at the DHCP servers by an enterprise IT department, to determine whether or not the platform is in an NAC enabled domain. Furthermore, this information may be secured by leveraging cryptographic signatures to protect the environment specific data. In an embodiment of the invention, data regarding a device domain may be signed using any industry standard signature method. The actual method used to sign this data is beyond the scope of this disclosure, as many different algorithms and techniques are readily available in the industry today. Upon securely detecting a given environment, the system may employ an administrator defined policy, such as AMT circuit breaker filter rules, based on this environment detection result. In an embodiment of the invention, the method is also able to distinguish between the scenarios of the platform being in a non-NAC environment versus the NAC stack on the platform being disabled.

In another embodiment of this invention, a system may include an Agent Presence platform feature or function that can be used to detect whether or not a software agent (such as NAC agent) is running on the host platform. In an alternative embodiment of the invention, a system uses the Agent Presence feature to determine whether an NAC agent is running on the system, and thus that an NAC environment exists.

In an embodiment of the invention, for the case of the static IP scenario, a pre-configured list of prefixes for enterprise domain IP prefixes and a pre-configured list NAC domain IP prefixes are applied. These lists will be preconfigured by the IT personnel for an enterprise based on the enterprise IT policy. The Intel® AMT firmware stack will implement the algorithm to check the statically configured IP address against these lists to determine its environment and the appropriate circuit breaker policies. While this description refers to network address prefixes, this embodiment of the invention is not limited to prefixes, but rather may include any pre-configured portion of an address.

In an embodiment of the invention, a system uses protocol operation (such as DHCP protocol options) to provide for environment detection. In an embodiment of the invention, a system may provide with either dynamic IP address allocation or static address allocation as follows (A) In a system utilizing dynamic IP address allocation, a process may include:

(1) Receiving a DHCP response to the AMT/host, and extracting the domain name information from the response to determine if the platform is in an enterprise domain.

(2) Configuring a DHCP option at the DHCP servers by the enterprise IT department to determine whether or not the platform is in an NAC enabled domain. The algorithm applies the circuit break filter rules based on the enterprise IT policy. The method is able to distinguish between the scenarios of the platform being in a non-NAC environment or the NAC stack on the platform being disabled.

Further, if Agent Presence is included as a platform feature, then this may optionally be used to detect whether or not a software agent, such as an NAC agent, is running on the host platform and further if it is involved in a communication dialog with the NAC framework.

(B) In a system utilizing static IP address allocation, a process may include:

(1) Pre-configured a list of prefixes, providing for enterprise domain IP prefixes and NAC domain IP prefixes. The list pre-configured by IT based on the enterprise IP policy.

(2) Checking the statically configured IP address of a device against the list to determine whether the appropriate environment and circuit breaker policies. The operation may be implemented using, for instance, the AMT firmware stack.

FIG. 1 is an illustration of an embodiment of detection of a network environment for the connection of a device to the network. As illustrated, a device seeks to connect to a network 105, which may be, for example, a local area network for an enterprise 110. The network provides network access control (shown as network access control module 140) to address the security of connecting devices using network management functions (shown as network management 145). However, the security applied may relate to the environment of device with regard to the enterprise 110 and to the network access control. For example, the device 130 may be located within the enterprise 110 and have network access control enabled 115. In a second example, the device 135 may located within the enterprise 110, but network access control is not enabled 120. Finally, the device 125 may be located outside of the enterprise 110.

In an embodiment of the invention, the network 105 detects the environment of a device seeking to connect to the network. In an embodiment, the environment may be detected both for static network addressing and for dynamic network addressing. In an embodiment, the environment is detected using the network access control 140 in conjunction with network management processes 145 for the network.

Figure 2:
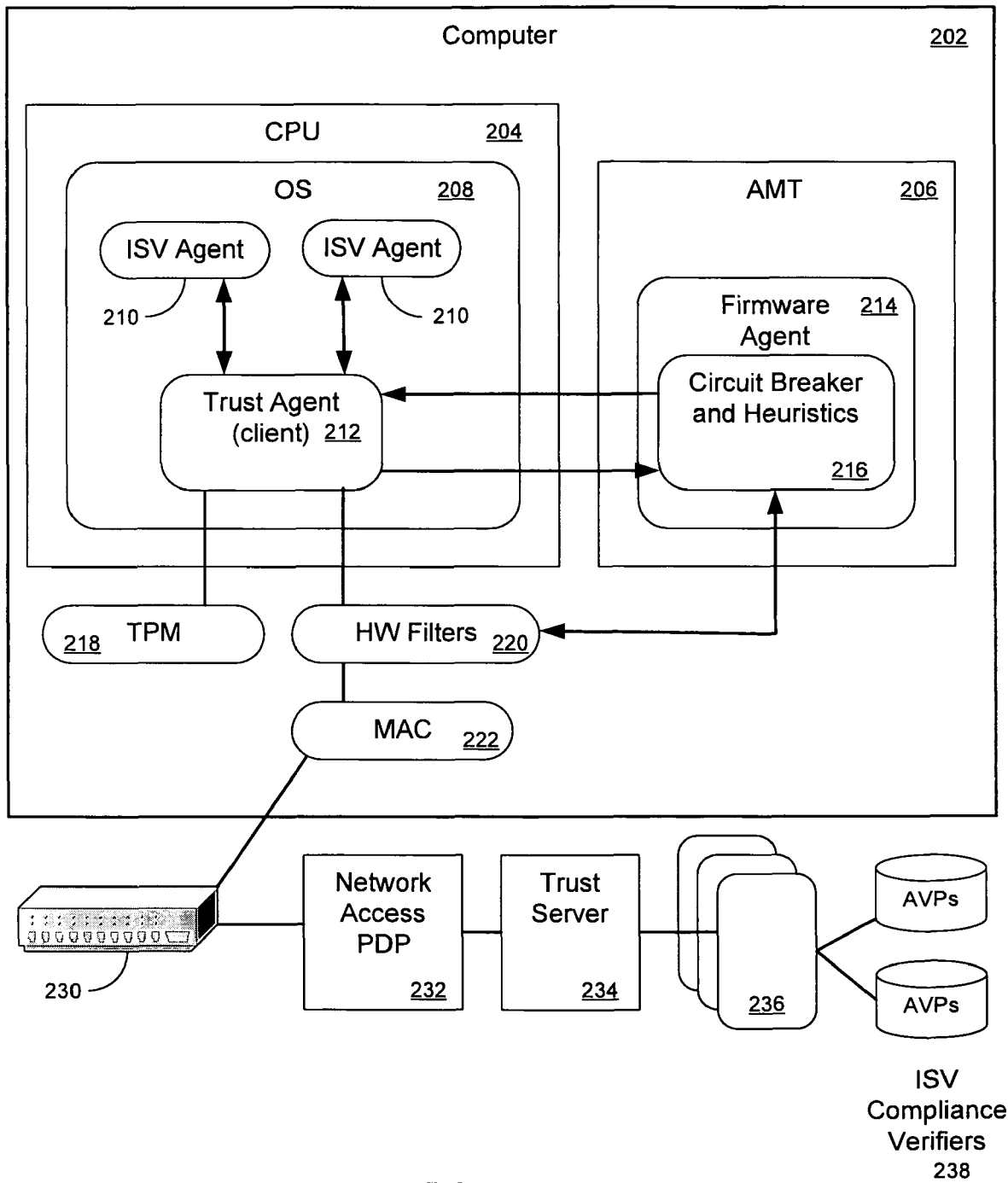
FIG. 2 illustrates an embodiment of a network architecture for detecting environments of devices.

FIG. 2 illustrates an embodiment of a network architecture for detecting environments of devices. As illustrated, a computer system 202 may represent a device to be connected to a network. The computer system 202 includes both a CPU (central processing unit) 204, which may include any number of processors or processor cores, and a management unit, which may include AMT technology 206. The OS (operating system) 208 for the CPU 204 may include multiple ISV (independent software vendor) agents 210 and a trust agent 212. The AMT module 206 includes a firmware agent 214 to provide management operations, which may include circuit breaker and heuristics 216. The trust agent may communicate with a TPM (trusted platform module) 218 of the computer 202. The computer may connect to a network, as shown by the connection via the hardware filters 220 and the MAC (Media Access Control) 222.

The computer 202 may be routed to a network access control architecture. For example, the computer may be routed via a network access device 230, which may be a router or switch, to a network access PDP (policy decision point). The network access PDP 232 is coupled with a trust server 234, which connects to storage of compliance vectors 236-238. In an embodiment of the invention, the AMT 206 is used in conjunction with the network access control to determine the environment of a device seeking to connect to the network.

Figure 3:
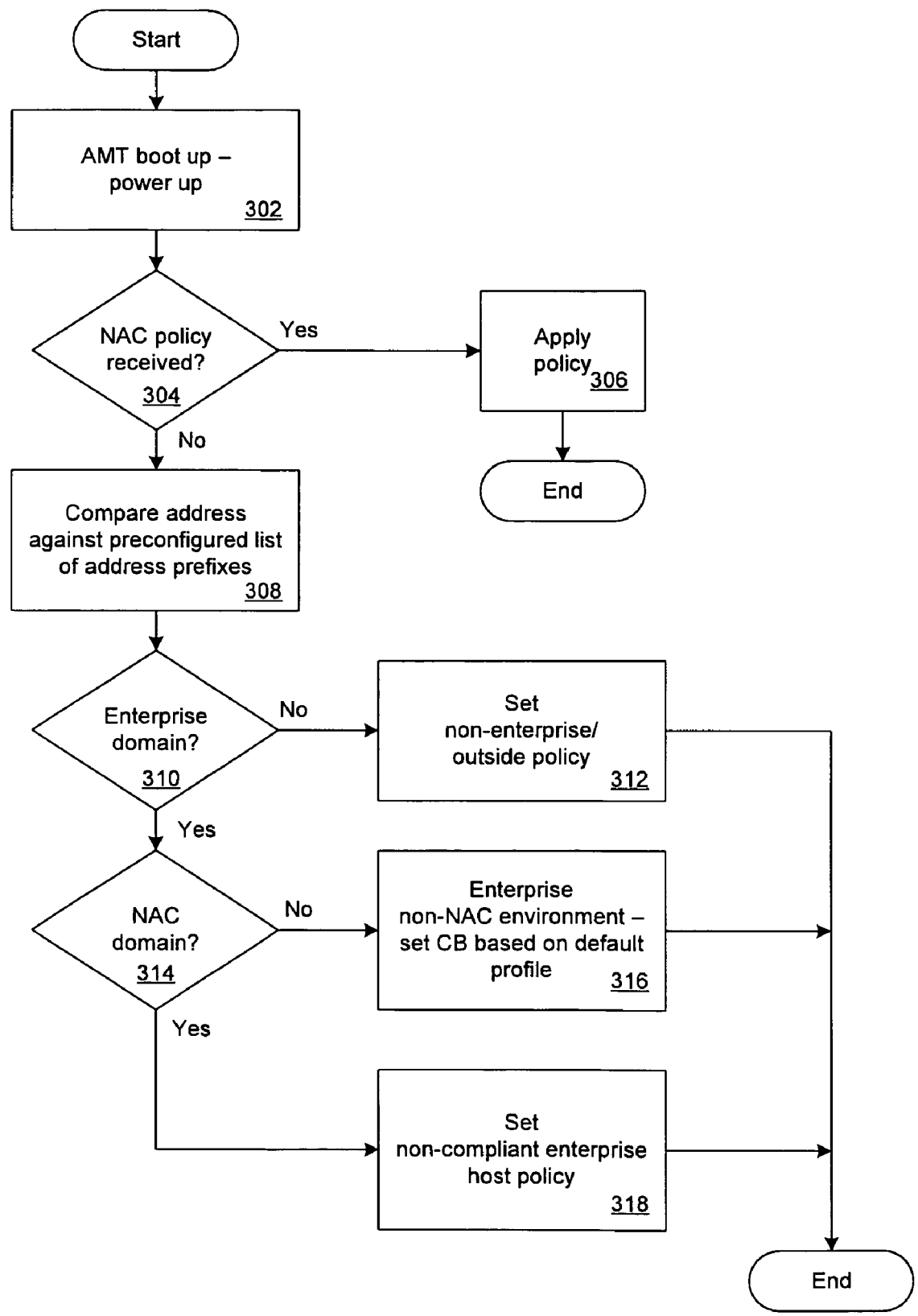
FIG. 3 is a flowchart to illustrate an embodiment of device connection security for static IP addressing.

FIG. 3 is a flowchart to illustrate an embodiment of device connection security for static IP addressing. In this embodiment, upon boot up, the network management (AMT) is booted up 302. If an NAC policy is received 304, then the policy is applied 306. If not, then the static address of the device is used to determine the device environment. For static addressing, a pre-configured list of address prefixes has been established by the enterprise IT. The address of the device seeking connection is obtained compared against the preconfigured list of address prefixes 308. Based on the address comparison, there is determination whether the device address indicates an enterprise domain location 310. If not, the appropriate policies are applied, shown as the non-enterprise/outside policy 312. If the address indicates an enterprise domain environment 310, then there is determination whether the address indicates a network access control (such as NAC) domain 314. If not, then the environment is enterprise non-NAC, and, for example, the circuit breaker may be set based on a default profile 316. If the address does indicate a network access control domain, then an issue exists regarding the failure to obtain an NAC policy, and a non-compliant enterprise host policy may be set 318.

Figure 4:
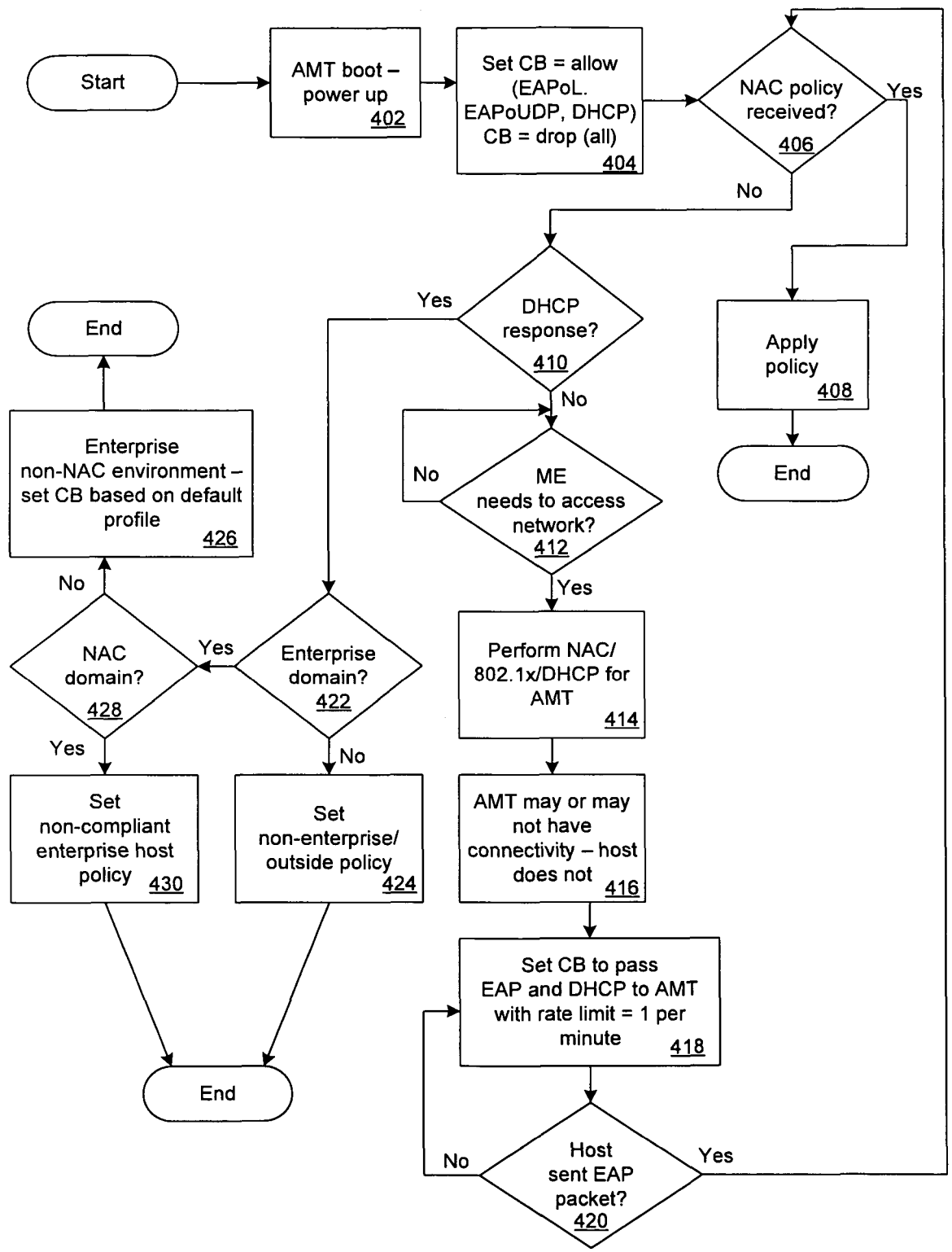
FIG. 4 is a flowchart to illustrate an embodiment of device connection security for dynamic IP addressing.

FIG. 4 is a flowchart to illustrate an embodiment of device connection security for dynamic IP addressing. This illustration provides for a particular implementation using AMT and NAC, but embodiments of the invention are not limited to this implementation. In this illustration, upon start up there is a boot up of the network management (such as AMT) in the power up stage 402. The circuit breaker (CB) is initially set to, for example, allow EAPoL (EAP over LAN), EAPoUDP (EAP over User Datagram Protocol), and DHCP 404. If an NAC policy is received 406, then the policy may be applied 408 and the process is ended. However, if no NAC policy is received, the system is to determine the environment of the connecting device in order to properly establish security requirements. In an embodiment of the invention, there is a determination whether a DHCP response was received 410. If there is no DHCP response 410 and there is a need to access the network 412, then an NAC/802.1X/DHCP inquiry is made for the AMT of the connecting device 414. At this point, the AMT may or may not have any connectivity, but the host does not 416 in accordance with the objective to protect the host from 'unfriendly' environments. The circuit breaker then may be set to a safe mode of passing EAP and DHCP to AMT with a slow rate, such as one message per minute 418. This continues until the host is sent an EAP packet 420, resulting in a return to the determination whether an NAC policy is received 406.

If there is a DHCP response 410, then there is determination whether the device is in an enterprise domain 422. If not, then non-enterprise/outside policy is set 424. If the device is in an enterprise domain 422, then there is a determination whether the device is contained in an NAC domain environment 428. If not, then an enterprise non-NAC environment policy is set, with the circuit break thus being set at a default profile 426. If the device is contained in an NAC domain 428, then there is a non-compliant situation because of the lack of an NAC policy, and a non-compliant enterprise host policy is set 430 implying that this environment is detected to be an NAC environment but an NAC policy was not received. In an embodiment of the invention, data regarding the domain may be signed according to an industry standard signature method utilizing any known cryptographic algorithm. In one possible example, a signature may be provided for the domain-specific data, with the signature being conveyed as, for example, an additional DHCP attribute of a response.

Figure 5:
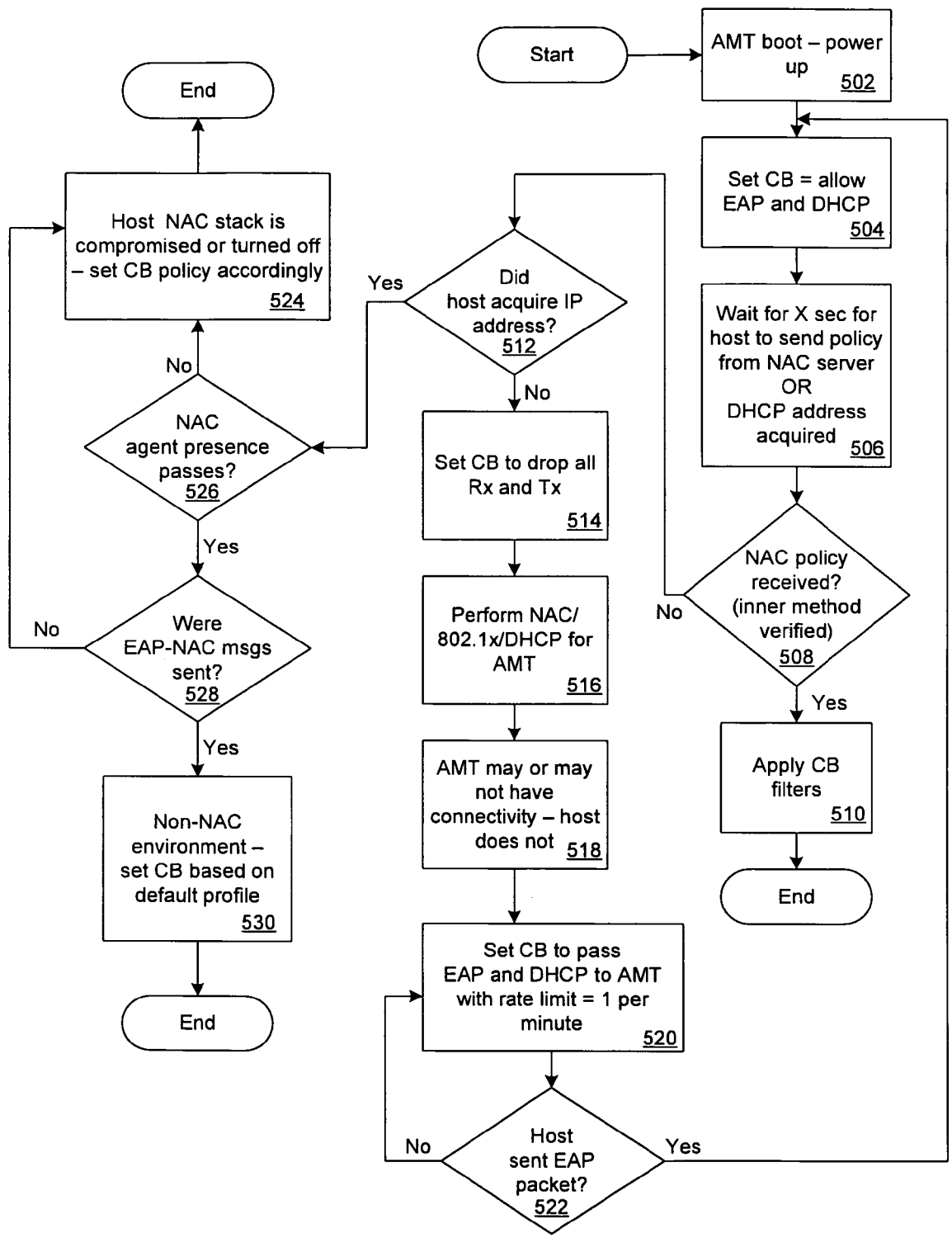
FIG. 5 is a flowchart to illustrate an embodiment of device connection security for dynamic IP addressing using agent presence.

FIG. 5 is a flowchart to illustrate an embodiment of device connection security for dynamic IP addressing using agent presence. This illustration provides for a particular implementation in which a determination of NAC agent presence is available. In this illustration, upon start up there is a boot up of the network management (such as AMT) in the power up stage 502. The circuit breaker (CB) is initially set to allow EAP and DHCP 504 or any other traffic based on the default policy for this state. The system waits for a certain number of seconds (as defined by administrative policy) for the host to receive the policy from the NAC server or for a DHCP address to be acquired 506. If an NAC policy is received 508, then the appropriate circuit breaker filters may be applied 510 and the process is ended. However, if no NAC policy is received, there is then a determination whether the host acquired an IP address 512. If not, the circuit breaker is to drop all receptions and transmission for the device 514, again based on which filtering policy is defined by administrative policy. There is then an NAC/802.1X/DHCP inquiry for the AMT of the connecting device 516. At this point, the AMT may or may not have any connectivity, but the host does not 518 in accordance with the objective to protect the host from 'unfriendly' environments. The circuit breaker then may be set to a safe mode of passing EAP and DHCP to AMT with a slow rate, such as one message per minute 520. This continues until the host is sent an EAP packet 522, resulting in a return to setting the circuit breaker to allow EAP and DHCP 504.

If the host does acquire an IP address 512, then there is a determination whether an NAC agent exists, which is determined by whether the NAC agent presence passes 526. If there is no NAC agent, then the host NAC stack has been compromised or turned off, and the circuit break policy is set accordingly, such as to drop all connections 524. If there is an NAC agent 526, but no EAP-NAC messages were sent out 528, it may again be concluded that the host NAC stack has been compromised or turned off, and the circuit break policy is set accordingly 524. If EAP-NAC messages were sent 528, then the connecting device is in a non-NAC environment, and the circuit breaker may be set on a default profile 530.

Figure 6:
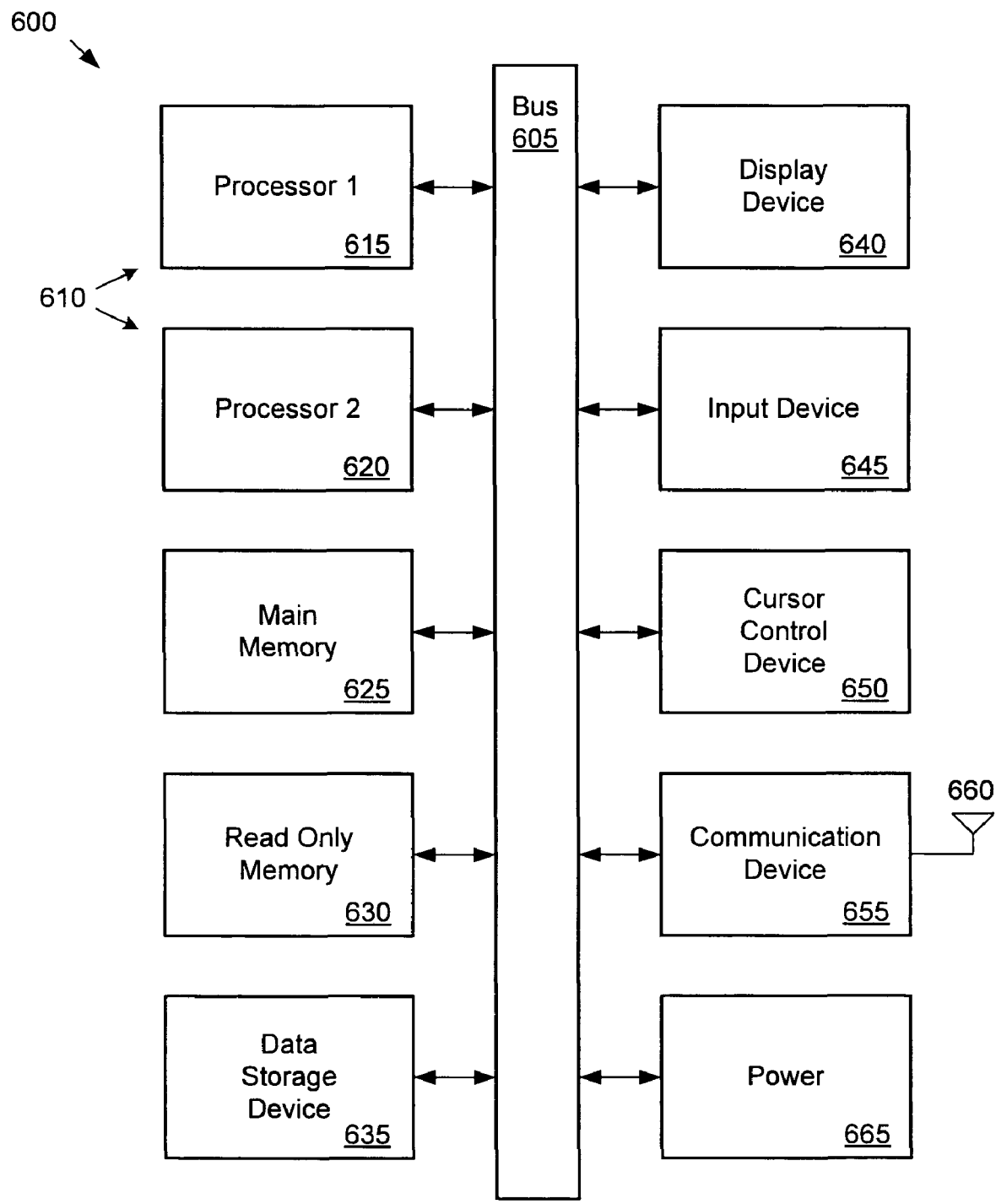
FIG. 6 is an illustration of a computer system for an embodiment of the invention.

FIG. 6 is an illustration of a computer system in an embodiment of the invention. The computer system may include a device that seeks to connect to a network. Certain standard and well-known components that are not germane to the present invention are not shown. Under an embodiment of the invention, a computer 600 comprises a bus 605 or other communication means for communicating information, and a processing means such as two or more processors 610 (shown as a first processor 615 and a second processor 620) coupled with the bus 605 for processing information. The processors 610 may comprise one or more physical processors and one or more logical processors. Further, each of the processors 610 may include multiple processor cores. The computer 600 is illustrated with a single bus 605 for simplicity, but the computer may have multiple different buses and the component connections to such buses may vary. The bus 605 shown in FIG. 6 is an abstraction that represents any one or more separate physical buses, point-to-point connections, or both connected by appropriate bridges, adapters, or controllers. The bus 605, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire". ("Standard for a High Performance Serial Bus" 1394-1995, IEEE, published Aug. 30, 1996, and supplements) In an embodiment of the invention, the processors 610 may be used to evaluate devices seeking to connect to a network.

The computer 600 further comprises a random access memory (RAM) or other dynamic storage device as a main memory 625 for storing information and instructions to be executed by the processors 610. Main memory 625 also may be used for storing temporary variables or other intermediate information during execution of instructions by the processors 610. RAM memory includes dynamic random access memory (DRAM), which requires refreshing of memory contents, and static random access memory (SRAM), which does not require refreshing contents, but at increased cost. DRAM memory may include synchronous dynamic random access memory (SDRAM), which includes a clock signal to control signals, and extended data-out dynamic random access memory (EDO DRAM). The uses of the main memory may include the storage of data related to the mitigation of dynamic platform noise. The computer 600 also may comprise a read only memory (ROM) 630 and/or other static storage device for storing static information and instructions for the processors 610.

A data storage device 635 may also be coupled to the bus 605 of the computer 600 for storing information and instructions. The data storage device 635 may include a magnetic disk or optical disc and its corresponding drive, flash memory or other nonvolatile memory, or other memory device. Such elements may be combined together or may be separate components, and utilize parts of other elements of the computer 600.

The computer 600 may also be coupled via the bus 605 to a display device 640, such as a cathode ray tube (CRT) display, a liquid crystal display (LCD), a plasma display, or any other display technology, for displaying information to an end user. In some environments, the display device may be a touch-screen that is also utilized as at least a part of an input device. In some environments, display device 640 may be or may include an audio device, such as a speaker for providing audio information. An input device 645 may be coupled to the bus 605 for communicating information and/or command selections to the processors 610. In various implementations, input device 645 may be a keyboard, a keypad, a touch-screen and stylus, a voice-activated system, or other input device, or combinations of such devices. Another type of user input device that may be included is a cursor control device 650, such as a mouse, a trackball, or cursor direction keys for communicating direction information and command selections to the one or more processors 610 and for controlling cursor movement on the display device 640.

A communication device 655 may also be coupled to the bus 605. Depending upon the particular implementation, the communication device 655 may include a transceiver, a wireless modem, a network interface card, LAN (Local Area Network) on motherboard, or other interface device. The uses of a communication device 655 may include reception of signals from wireless devices. For radio communications, the communication device 655 may include one or more antennas 660. In one embodiment, the communication device 655 may include a firewall to protect the computer 600 from improper access. The computer 600 may be linked to a network or to other devices using the communication device 655, which may include links to the Internet, a local area network, or another environment. The computer 600 may also comprise a power device or system 665, which may comprise a power supply, a battery, a solar cell, a fuel cell, or other system or device for providing or generating power. The power provided by the power device or system 665 may be distributed as required to elements of the computer 600.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention may include various processes. The processes of the present invention may be performed by hardware components or may be embodied in machine-executable instructions, which may be used to cause a general-purpose or special-purpose processor or logic circuits programmed with the instructions to perform the processes. Alternatively, the processes may be performed by a combination of hardware and software.

Portions of the present invention may be provided as a computer program product, which may include a computer-readable medium having stored thereon instructions, which may be used to program a computer (or other electronic devices) to perform a process according to the present invention. The computer-readable medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. A network access control (NAC) method comprising: receiving a request at a network access control module to connect a device to a network; if a security policy is received for the connection of the device, applying the received security policy for the device; if a security policy for the connection of the device is not received, then: determining the domain of the device and establishing a security policy for the connection of the device based on the determined domain as follows: determining whether the device is in an enterprise domain, and, if not, setting a non-enterprise security policy, and if the device is in the enterprise domain, then determining whether the device is in a network access control domain, and, if the device is not in a network access control domain, then setting a non-NAC environment security policy, and, if the device is in a network access control domain, then setting a non-compliant enterprise host security policy, and applying the established security policy to the device; and determining whether to approve the request to connect the device to the network based at least in part on the security policy applied for the device; wherein applying a security policy comprises enforcing security policy compliance for devices connecting to the network.

2. The method of claim 1, wherein the network provides for static network addressing, and further comprising extracting a network address for the device.

3. The method of claim 2, wherein determining the domain of the device comprises comparing an element of the network address to a list of pre-configured address elements.

4. The method of claim 1, wherein the network provides for dynamic network addressing.

5. The method of claim 4, further comprising determining whether a response from the device is received.

6. The method of claim 5, wherein the response comprises a DHCP (dynamic host configuration protocol) response.

7. The method of claim 5, wherein if a response from the device is received then determining whether the device is in an enterprise domain comprises extracting domain information from the response.

8. The method of claim 7, wherein determining whether the device is in a network access control domain comprising applying a configured protocol option to the response.

9. The method of claim 4, wherein an agent presence feature is available, and wherein determining the domain of the device comprises determining whether a network access control agent is present.

10. The method of claim 1, further comprising signing data regarding the domain of the device using an industry standard signature method and conveying the data as part of a DHCP (dynamic host configuration protocol) response.

11. A network security apparatus for a network comprising: a network access control module, wherein, if the network access control module receives a security policy for the connection of a device to the network, the network access module is to identify the received security policy for the device, and, if the network access control module does not receive a security policy for the connection of a device to the network, the network access control module is to identify the platform of the device and a security policy for the connection of the device, the identification of the platform and security policy including: a determination whether the device in contained in an enterprise domain, and, if not, identifying a non-enterprise security policy, and if the device is in the enterprise domain, then a determination whether the device is contained in a network access control domain, and, if the device is not in a network access control domain, then identifying a non-NAC environment security policy, and, if the device is in a network access control domain, then identifying a non-compliant enterprise host security policy; and a network management module, the network management module to control access of the device to the network based at least in part on the determination of the platform of the device and the identified security policy; wherein to control access of the device to the network based at least in part on a security policy comprises enforcing security policy compliance for devices connecting to the network.

12. The network security apparatus of claim 11, wherein the network utilizes static IP (Internet protocol addressing), and wherein identification of the platform of the device by the network access control module includes comparing an element of an address of the device to a list of pre configured address elements.

13. The network security apparatus of claim 11, wherein the network utilizes dynamic IP (Internet protocol addressing), and wherein identification of the platform of the device by the network access control module includes extracting data from a response of the device.

14. The network security apparatus of claim 11, wherein the network utilizes dynamic IP (Internet protocol addressing), and wherein identification of the platform of the device by the network access control module includes using a presence function to determine whether a network access control agent is present.

15. A system comprising: a network access control module for a network to determine network access for a device; a trust server to provide compliance vectors to the network access control module; and a router, the router to direct a device connection request to the network access control module, the device supporting a network management system; wherein, if the network access control module receives a security policy for the connection of a device to the network, the network access control module is to identify the received security policy for the device, and, if the network access control module does not receive a security policy for the connection of a device to the network, the network access control module obtains data regarding the device to determine the domain of the device, including: whether the device is contained in an enterprise domain, and, if not, identifying a non-enterprise security policy, and if the device is in the enterprise domain, then whether the device is contained in a network access control domain, and, if the device is not in a network access control domain, then identifying a non-NAC environment security policy, and, if the device is in a network access control domain, then identifying a non-compliant enterprise host security policy; wherein for the connection of a device to the network based at least in part on a security policy comprises enforcing security policy compliance for devices connecting to the network.

16. The system of claim 15, wherein the network management system enforces the identified security policy for access to the network by the device.

17. The system of claim 15, wherein the network utilizes static IP (Internet Protocol) addressing, and wherein determining the domain of the device includes comparing at least a portion of the address of the device to a list of pre configured address elements.

18. The system of claim 15, wherein the network utilizes dynamic IP (Internet Protocol) addressing.

19. The system of claim 18, wherein determining the domain of the device includes receiving a response for the device and extracting the domain for the device from the response.

20. The system of claim 18, wherein determining the domain of the device includes using a presence function to determine the presence of a network access control agent.

21. The system of claim 15, wherein the data regarding the domain of the device is signed using an industry standard signature method and is conveyed as part of a DHCP (dynamic host configuration protocol) response.

22. A non-transitory computer-readable medium having stored thereon data representing sequences of instructions that, when executed by a processor, cause the processor to perform operations comprising: receiving a request at a network access control module to connect a device to a network; if a security policy is received for the connection of the device, applying the received security policy for the device; and if a security policy for the connection of the device is not received, then: determining the domain of the device and establishing a security policy for the connection of the device based on the determined domain as follows: determining whether the device is in an enterprise domain, and, if not, setting a non-enterprise security policy, and if the device is in the enterprise domain, then determining whether the device is in a network access control domain, and, if the device is not in a network access control domain, then setting a non-NAC environment security policy, and, if the device is in a network access control domain, then setting a non-compliant enterprise host security policy, and applying the established security policy to the device; and determining whether to approve the request to connect the device to the network based at least in part on the security policy applied for the device; wherein applying a security policy comprises enforcing security policy compliance for devices connecting to the network.

23. The medium of claim 22, wherein the network provides for static network addressing, and wherein determining whether the device is in an enterprise domain and determining whether the device is in a network access control domain comprises comparing an element of the network address of the device to a list of pre-configured address elements.

24. The medium of claim 22, wherein the network provides for dynamic network addressing, and wherein determining the domain of the device comprises extracting domain information from a response from the device.

25. The medium of claim 22, wherein the network provides for dynamic network addressing, and wherein determining the domain of the device comprises determining whether a network access control agent is present.

* * * * *